Figure 1:
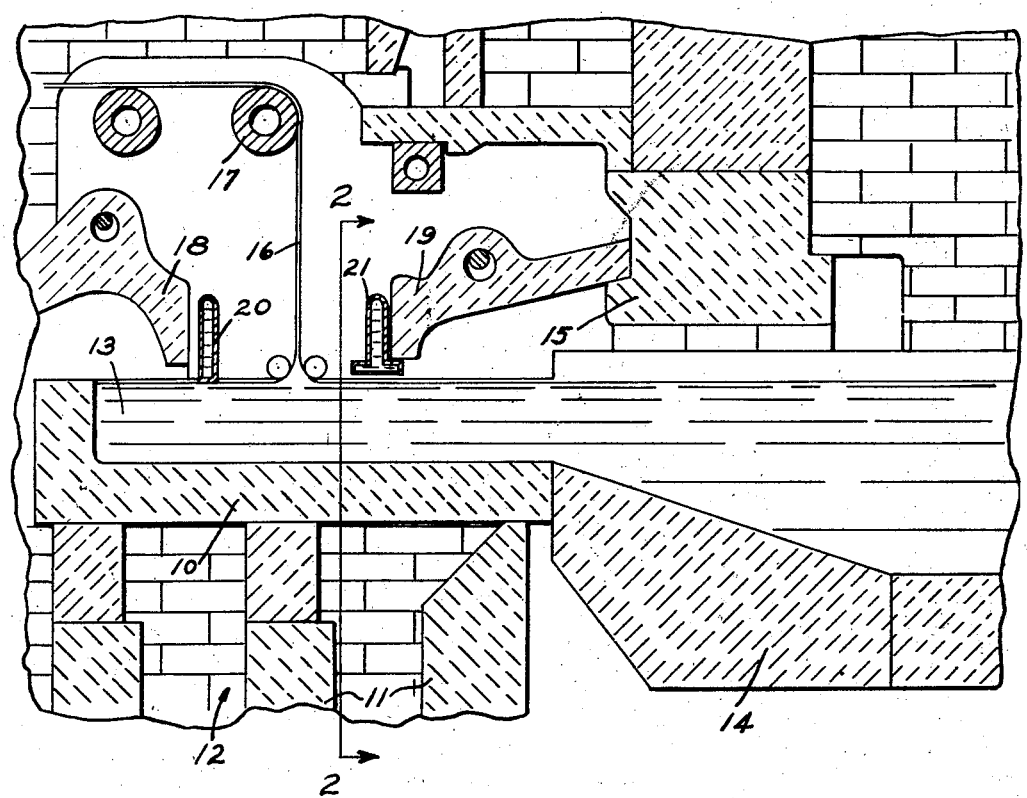

March 10, 1931.  W. FRENCH  1,795,943
APPARATUS FOR DRAWING SHEET GLASS
Filed Feb. 7, 1927

Inventor
Wert French
By Frank Fraser
Attorney

Patented Mar. 10, 1931

1,795,943

UNITED STATES PATENT OFFICE

WERT FRENCH, OF CHARLESTON, WEST VIRGINIA, ASSIGNOR TO LIBBEY-OWENS-FORD GLASS COMPANY, OF TOLEDO, OHIO, A CORPORATION OF OHIO

APPARATUS FOR DRAWING SHEET GLASS

Application filed February 7, 1927. Serial No. 166,285.

This invention relates to sheet glass apparatus and has more particular references to an improved method and apparatus for producing a continuous sheet.

In the system of drawing sheet glass substantially set forth in the Colburn Patent No. 1,248,809 granted Dec. 4, 1917, a mass of molten glass is continuously produced in a tank furnace from which it then flows into a shallow receptacle or draw-pot. A continuous sheet of glass is drawn upwardly from the surface of the molten glass in the draw-pot, then bent while still somewhat plastic about a cooled bending roller and carried away horizontally through an annealing leer. The surface glass adjacent the sheet source is exposed to the cooling influence of the air, and heat absorbing shields or coolers are placed closely adjacent the surface glass at each side of the sheet to protect said sheet from heated gases from the furnace, and also to absorb heat from the surface glass flowing thereunder. By this means, the molten glass is chilled just prior to being drawn into sheet form, to reduce it to the proper drawing temperature.

Heretofore, it has been customary at times, to place an additional cooler or heat absorbing body closely adjacent the surface of molten glass just before it passes under the jack-arch of the furnace into the receptacle or draw-pot. This additional cooling body functions to protect the surface glass in the draw-pot from the direct action of the heated gases from the furnace and also, by rapidly absorbing heat from the surface strata of the flowing glass prior to its entrance to the draw-pot expedites the conditioning of the glass in the pot and permits more rapid withdrawal of glass therefrom in sheet form.

However, due to the distance between the additional cooling body and point at which the sheet is drawn, it has been found that the glass is cooled too soon, with the result that a portion of it becomes devitrified before it reaches the point of draw. Consequently, the provision of the additional cooling body resulted in the formation of so-called dog-metal, which is simply devitrified glass, under the jack-arch and front or adjacent lip-tile, and this dog-metal, subsequently finding its way into the sheet would produce defects therein.

It is an aim of the present invention to make possible the elimination of this additional cooling body, and thus do away with the formation of dog-metal, without in any way reducing the speed at which the glass can be conditioned and drawn.

According to the present invention, this is accomplished by constructing the cooler or shield at the side of the sheet adjacent the furnace, with a relatively greater heat absorbing surface than theretofore and greater than the heat absorbing surface of the cooler or shield at the opposite side of the sheet. This improved cooler will not only function to protect the surface glass from which the sheet is drawn from direct action of heated gases from the furnace, but will also serve to more rapidly chill the surface strata of the flowing glass whereby to expedite the conditioning of the glass to permit a more rapid withdrawal thereof from the receptacle. Thus, this improved cooler will accomplish all of the objects of the additional cooling body referred to above without resulting in the formation of dog-metal.

It is an object of this invention to accomplish the above advantages by providing a cooler enlarged at its lower end to create a greater heat absorbing surface which will produce a greater chilling effect on the molten glass passing thereunder to permit a more rapid withdrawal thereof.

It is another object of the invention to provide such an improved cooler positioned adjacent the front lip-tile with its enlarged bottom portion extending therebeneath.

Other objects and advantages of the invention will become more apparent during the course of the following description when taken in connection with the accompanying drawings.

Figure 2:
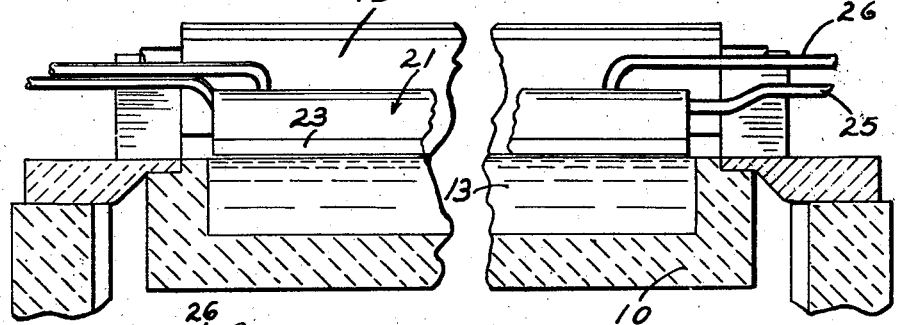
Figure 3:
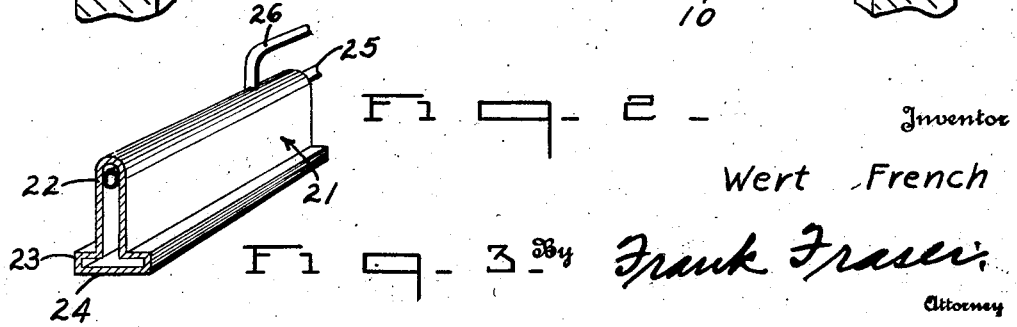

In the drawings forming a part of this application and wherein like numerals are employed to designate like parts throughout the same, Fig. 1 is a longitudinal vertical section through those portions of the sheet producing mechanism directly concerned with the present invention, Fig. 2 is a transverse vertical section taken substantially on the line 2—2 of Fig. 1, and Fig. 3 is a perspective sectional view of a cooler constructed in accordance with the present invention.

In the drawings, the numeral 10 generally designates a receptacle or draw-pot supported upon stools 11 arranged within a heating chamber 12 and containing a mass of molten glass 13. This molten glass is continuously supplied to the receptacle 10 from a tank furnace 14 and the molten glass, as it flows therefrom into the said receptacle, passes under a jack-arch 15. A sheet of glass 16 is continuously drawn upwardly from the surface of the molten glass 13 in receptacle 10, and at a substantial distance from its source, the sheet is deflected into a horizontal plane about a suitable bending roller 17 and carried horizontally through an annealing leer, not shown, where it is gradually reduced to room temperature as is well known in the art.

Arranged above the pot 10, at opposite sides of the sheet are cover or lip-tiles 18 and 19 which tend to force any heat currents present at that point downwardly towards the surface of the molten glass 13. Also positioned at opposite sides of the sheet 16 and immediately adjacent the surface of the molten glass 13 are coolers or shields 20 and 21 which serve to protect the sheet from heated air currents escaping from the furnace and heating chamber, and at the same time aid in absorbing the heat from the molten glass passing thereunder to give it the proper viscosity to permit it to be drawn away in sheet form.

In accordance with the present invention, the cooler 21, adjacent the front lip-tile 19 is provided with a relatively greater heat absorbing surface than the cooler or shield 20. As shown, the cooler 21 is in the form of an elongated hollow metallic casing comprising an upper substantially narrow portion 22 and a laterally enlarged lower portion 23 to create a substantially wide heat absorbing surface 24. This cooler is preferably placed closely adjacent the front lip-tile 19 to permit the lower portion 23 thereof to extend under the lip-tile as shown in Fig. 1. A cooler of this construction will naturally absorb a greater amount of heat and will produce a greater chilling effect on the molten glass passing thereunder, whereby to permit a more rapid withdrawal thereof into sheet form. Moreover, because it is positioned closer to the point of draw, the chilled glass will not be given time to become devitrified before it is drawn into sheet form. Thus, the elimination of dog-metal under the jack arch and front lip-tile is accomplished. It is also desirable that the cooler adjacent the furnace have a greater heat absorbing area than the opposite cooler for the reason that the glass is somewhat hotter at this side of the sheet than at the other and because the gases escaping from the furnace are also hotter than the gases escaping up around the end of the receptacle.

The cooler 21 is adapted to be internally cooled by circulating a suitable cooling medium therethrough such as relatively cool water. This cooling medium enters the cooler through the pipe 25 extending longitudinally therewithin and passes from the said pipe through a plurality of openings therein. This cooling medium as it becomes heated passes upwardly and exteriorly of the cooler through the pipe 26.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, a tank furnace arranged adjacent to and in open communication with said receptacle for supplying the molten glass thereto, means for drawing a sheet vertically from the molten glass in said receptacle, and heat absorbing bodies comprising hollow metallic, internally cooled members arranged transversely of and at opposite sides of the sheet for cooling the glass just prior to its introduction into the sheet, the cooling member at the side of the sheet adjacent the furnace being spaced above the mass of molten glass and having a lateral, internally cooled extension at its lower end.

2. In a sheet glass apparatus, a receptacle containing a mass of molten glass, a tank furnace arranged adjacent to and in open communication with the receptacle for supplying the molten glass thereto, means for drawing a sheet vertically from the molten glass in said receptacle, lip tiles arranged at opposite sides of the sheet above the molten glass in the receptacle, heat absorbing bodies comprising hollow metallic coolers arranged at opposite sides of the sheet inwardly of the lip tiles for cooling the glass just prior to its introduction into the sheet, the cooler at the side of the sheet adjacent the furnace being spaced above the mass of molten glass and having a larger heat absorbing area exposed to the glass passing thereunder than the other cooler and being provided with a lateral extension projecting beneath the adjacent lip tile.

Signed at Charleston, in the county of Kanawha and State of West Virginia, this second day of February, 1927.

WERT FRENCH.